United States Patent [19]
Uhrig

[11] 3,905,333
[45] Sept. 16, 1975

[54] CAGE FOR LABORATORY ANIMALS

[75] Inventor: Charles L. Uhrig, Harrisonville, Mo.

[73] Assignee: Schroer Manufacturing Company, Kansas City, Mo.

[22] Filed: May 13, 1974

[21] Appl. No.: 469,239

[52] U.S. Cl. .................................. 119/17; 119/19
[51] Int. Cl.² ........................................ A01K 1/02
[58] Field of Search .......................... 119/19, 17, 22

[56] References Cited
UNITED STATES PATENTS

| | | | |
|---|---|---|---|
| 1,878,459 | 9/1932 | Bliss, Jr. et al. | 119/19 X |
| 3,225,738 | 12/1965 | Palencia | 119/17 |
| 3,292,582 | 12/1966 | Rubricus | 119/17 |
| 3,429,297 | 2/1969 | Schroer | 119/17 |

*Primary Examiner*—Hugh R. Chamblee
*Attorney, Agent, or Firm*—Fishburn, Gold & Litman

[57] ABSTRACT

A cage for laboratory animals, such as dogs, rabbits, and the like includes a frame having a base and a top and a plurality of support members for supporting cage walls which cooperate with the frame to define an enclosure for at least one animal and one of the cage walls is mounted for swinging movement to open the interior for access thereto and to close same to retain the animal therein. The cage has a urine deflector on certain cage walls with portions supporting a cage floor having openings over substantially the entire area thereof to permit animal waste to pass therethrough and into an open-top receptacle supported on the base of the frame and positioned below the cage floor. The urine deflector has a portion serving as a floor portion substantially increasing the useable floor area of the cage, said urine ledge deflector extending from the respective wall with an inclination sufficient to permit liquid animal waste to flow toward and through the cage floor and into the receptacle while serving as a floor portion.

4 Claims, 4 Drawing Figures

CAGE FOR LABORATORY ANIMALS

The present invention relates to cages for laboratory animals, and the like and more particularly to such a cage having a novel urine deflector which extends inwardly from certain cage walls and supports a generally open cage and serves as a floor portion and causes liquid animal waste to flow toward and through the generally open cage floor.

Laboratory animals, such as dogs, rabbits and the like, are usually maintained in metal cages for study. Government regulations have established certain requirements as to cages and one is that the cage must have a certain floor area for each animal. Heretofore, animal cages have had a urine deflector which was sloped at substantially a 45° angle and such deflector could not be included in the floor area to meet such government regulations.

The principle objects of the present invention are: to provide a cage for laboratory animals which is constructed to provide the required cage floor area without an increase in overall size of the cage; to provide such a cage having a urine deflector having portions thereof arranged to substantially increase the useable cage floor area; to provide such a cage including a urine deflector having a floor portion inclined sufficiently to permit flow of liquid animal waste toward a collection receptacle yet being sufficiently level to be included in the useable cage floor area; to provide such a cage including a urine deflector having portions thereof adapted to support a flat wire or like cage floor; to provide such a cage and urine deflector therefor wherein a floor portion of the urine deflector and an upper surface of a cage floor are substantially flush; and to provide such a cage and urine deflector therefor which is economical to manufacture, durable in construction, and particularly well adapted to provide an increased useable floor area without a corresponding increase in overall size of the cage.

Other objects and advantages of this invention will become apparent from the following description taken in connection with the accompanying drawings wherein are set forth, by way of illustration and example, certain embodiments of this invention.

The drawings constitute a part of this specification and include an exemplary embodiment of the present invention and illustrate various objects and features of the cage for laboratory animals and the urine deflector therefor.

Figure 1:
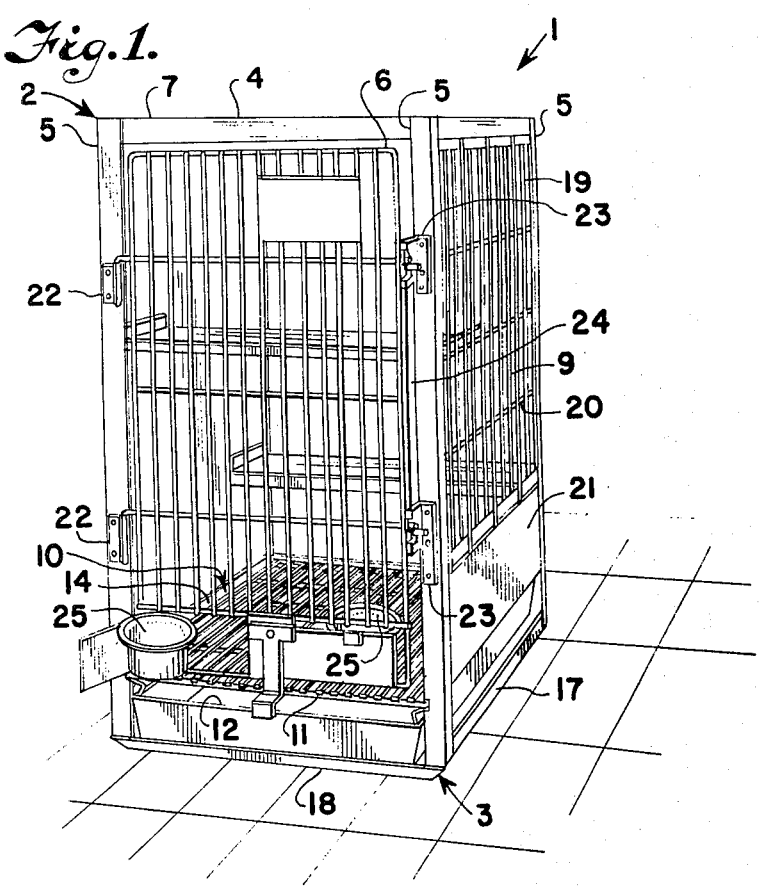
FIG. 1 is a perspective view of a cage for laboratory animals and a urine deflector therefor embodying features of the present invention.
Figure 3:
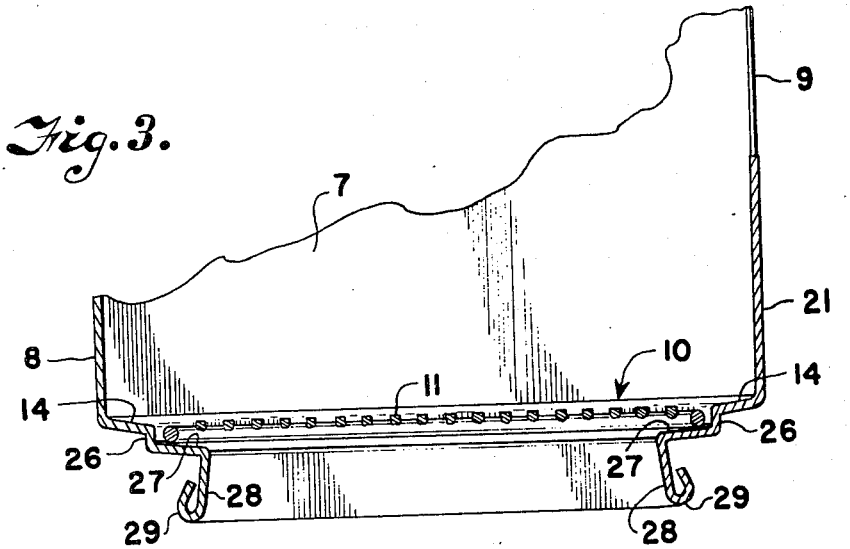
FIG. 3 is an enlarged sectional view taken on line 3—3, FIG. 2.
Figure 2:
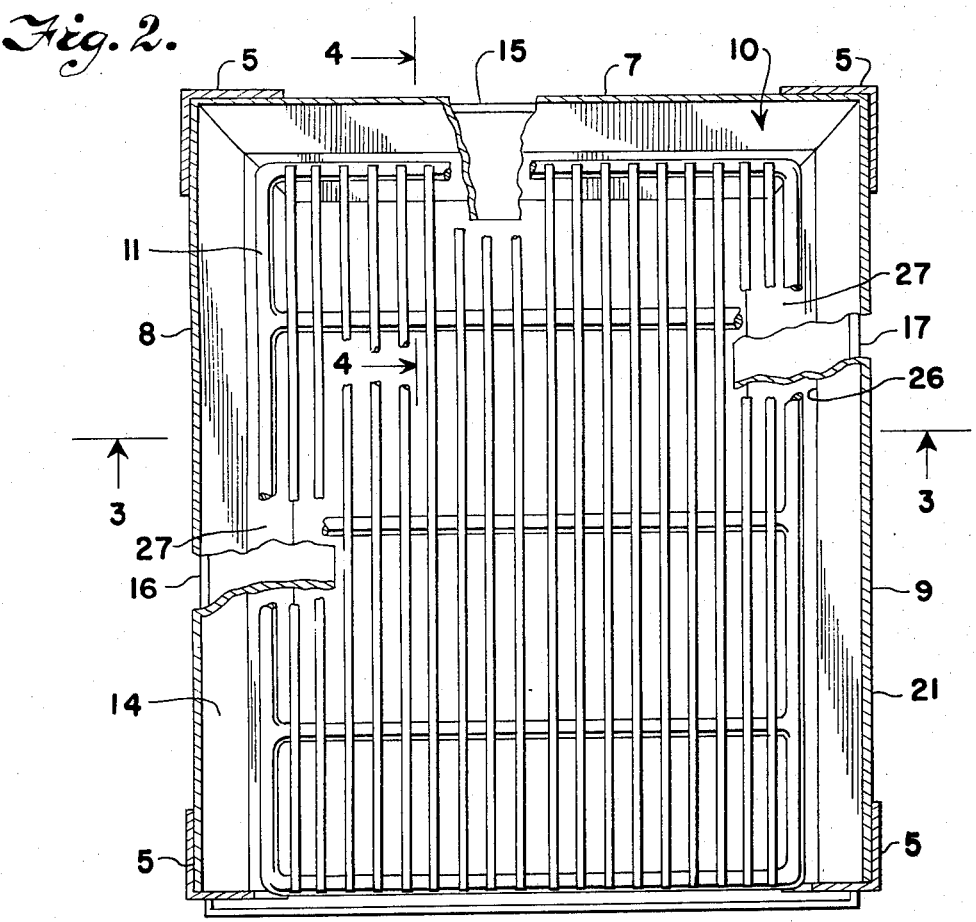
FIG. 2 is an enlarged plan view of a cage floor and a urine deflector supporting same.
Figure 4:
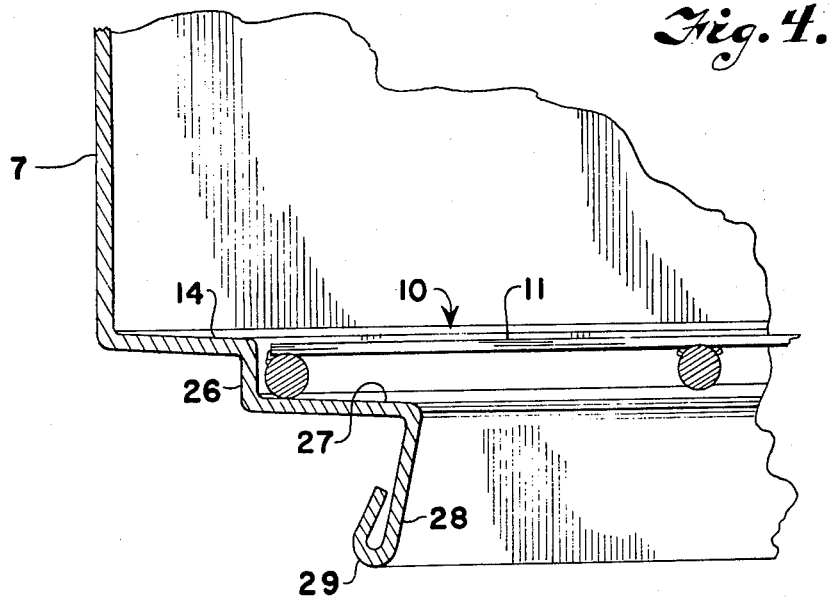
FIG. 4 is a further enlarged fragmentary sectional view taken on line 4—4, FIG. 2 and showing the urine deflector and a respective edge portion of the cage floor supported thereon.

Referring more in detail to the drawings:

As required, detailed embodiments of the present invention are disclosed herein. However, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriately detailed structure.

In the disclosed embodiment of the present invention, the reference numeral 1 generally designates a cage for laboratory animals, such as dogs, rabbits and the like. The cage 1 includes a frame 2 having a base 3 and a top 4 and a plurality of support members 5 extending therebetween at the corners for supporting cage walls including front and rear cage walls 6 and 7 respectively and opposed side walls 8 and 9 arranged to define an enclosure for at least one animal. One of the cage walls, for example the front wall 6, is mounted for swinging movement to open the interior for access thereto and to close same to retain the animal therein. The cage 1 includes a urine deflector 10 on certain of the cage walls to support a cage floor 11 having openings over substantially the entire area thereof to permit animal waste to pass therethrough and into an open-top receptacle 12 supported on the base 3 of the frame 2 and positioned below the cage floor 11. The urine deflector 10 has a floor portion 14 adapted to substantially increase the useable floor area of the cage 1 and the floor portion 14 is inclined downwardly toward the interior and from the respective cage wall sufficiently to permit liquid animal waste to flow toward and through the cage floor 11 and into the receptacle 12 while being sufficiently level to be included in the useable floor area of the cage 1.

In the illustrated structure, the base 3 of the frame 2 includes a rear structural member, such as an angle 15, having a generally horizontal leg and an upwardly extending leg to define an abutment or stop for the open-top receptacle 12. The base 3 includes side structural members, such as angles 16 and 17, each having a generally horizontal leg and a generally upright leg defining guides for movement of the open-top receptacle 12. The side members 16 and 17 extend forwardly from respective opposite ends of the rear member 15 and a front member 18 extends between forward ends of the side members 16 and 17 and the front member 18 is illustrated as a bar providing a support for the open-top receptacle 12 while permitting same to be installed and removed from the cage 1 through an open front below the front wall 6 and between the support members 5 of the frame.

The support members 5 are positioned at corners of the cage and each has a lower end thereof suitably secured to the base 3 and extends upwardly therefrom. The support members 5 may be any suitable structural member, such as angles, adapted to have the top 4 and the walls 6 to 9 inclusive supported thereon to thereby define a substantially rigid structure.

The top 4 of the frame 2 may be any suitable member to define an upper limit for the cage 1. The top 4 may be open or closed and in the illustrated structure, the top 4 is formed of a planar member secured to upper ends of the support members 5.

The cage walls extend between and are secured to the support members 5 and in the illustrated structure, the cage walls are arranged in opposed pairs to define an enclosure for at least one animal. The front wall or door 6 is mounted for swinging movement to selectively open the interior for access thereto and to close same to retain the animal. Preferably, at least one of the cage walls has spaced openings over a major portion of the area thereof to permit observation of the animal and to provide air for the animal therein.

In the illustrated structure, the rear wall 7 is a planar member formed of a solid plate or the like and at least one of the side walls, for example side wall 8, is also a planar member thereby closing the rear and one side of the cage 1. The other side wall 9 and the front wall or door 6 is formed of a plurality of spaced upwardly extending rods or bars 19 and a plurality of spaced generally horizontal rods or bars 20. The side wall 9 has a plate 21 defining a lower portion thereof and having a lower edge aligned with respective lower edges of the rear wall 7 and the other side wall 8.

The front wall or door 6 has suitable hinges 22 mounted on one side edge thereof and on the adjacent support member 5 and the other side edge of the front wall or door has suitable latch members 23 mounted thereon and received within a suitable keeper member 24 mounted on the support member 5 adjacent the other side of the front or door 6.

The front wall or door 6 has suitable means thereon to support suitable receptacles 25 for water and food. The means supporting the receptacles 25 preferably permit swinging movement of the receptacle 25 to thereby permit movement of food into the interior of the cage without opening the front door or wall 6.

The urine deflectors 10 provide means extending from the cage rear wall 7, side wall 8 and side wall plate 21 and toward the interior for supporting the cage floor 11 thereon at a position above the open-top receptacle 12 and below the lower edge of the door 6. Each urine deflector 10 has a floor portion 14 extending from the receptive cage wall or plate 21 and the floor portion 14 is substantially level so as to be included in the floor area of the cage 1 and is inclined downwardly from the respective cage wall and toward the interior sufficiently to permit liquid animal waste to flow toward the cage floor 11. Each floor portion 14 of the urine deflector 10 has an inner edge spaced from the respective cage wall or plate 21.

Each urine deflector 10 includes a generally vertical wall portion 26 depending from the inner edge of the floor portion 14 of the respective deflector 10. The wall portion 26 is spaced from the respective cage wall or plate 21 and the wall portion 26 defines a shoulder which is engageable by a respective peripheral edge of the cage floor 11.

Each wall portion 26 terminates at a lower edge having a ledge portion 27 extending inwardly therefrom. The ledge portion 27 is spaced below the floor portion 14 and is adapted to support a respective edge portion of the cage floor 11 thereon. The ledge portion 27 is preferably inclined downwardly and inwardly from the respective vertical wall portion 26 sufficiently to permit liquid animal waste to flow therefrom and into the open-top receptacle 12.

The spacing between the floor portion 14 and the ledge portion 27 of each of the urine deflectors 10 is substantially equal to the thickness of the respective edge portion of the cage floor 11 supported on the ledge portion 27 whereby an upper surface of the cage floor 11 and respective upper surfaces of the floor portions 14 are substantially flush. The upper surface of the cage floor 11 and the upper surfaces of the urine deflectors 10 thereby cooperate to define the total useable floor area.

It is desirable that the urine deflectors 10 be substantially rigid members to provide a stable support for the cage floor 11, therefore, a rib or flange 28 depends from an inner edge of the ledge portion 27 and provides additional strength and rigidity to the urine deflector 10. The flange 28 of each of the urine deflectors 10 has a lower edge thereof positioned above the open-top receptacle 12. In the illustrated structure, a lower edge of the flange 28 has a return bend portion 29 defining a drip edge for liquid waste.

The cage floor 11 may be any suitable structure having respective edge portions thereof supported on ledge portions 27 of the urine deflectors 10 and the cage floor 11 defines a lower limit of the animal enclosure, said cage floor being adjacent to and below the door 6 and of a width to be removable through the front of the cage. The cage floor 11 has a plurality of spaced openings over substantially the entire area thereof to permit animal waste to past therethrough. In the illustrated structure, the cage floor 11 is formed of a plurality of flat bars which are longitudinally and laterally spaced to provide a surface having sufficient area for support of the respective animal and sufficient open space to permit animal waste to past therethrough.

It is to be understood that while I have illustrated and described one form of my invention, it is not to be limited to the specific form or arrangement of parts herein described and shown.

What I claim and desire to secure by Letters Patent is:

1. A urine deflector for supporting a cage floor having spaced openings in a cage for laboratory animals and having cage rear and side walls and a front door cooperating with a cage frame to define an enclosure for at least one animal and having an open top waste collecting receptacle removably positioned in a lower portion thereof, said urine deflector comprising:

a. floor portions extending from respective cage side and rear walls, said floor portions being inclined downwardly from the respective cage walls and toward the interior of the cage sufficiently to permit liquid animal waste to flow toward a cage floor, said floor portion being inclined at such a minimum angle as to cooperate with a cage floor in forming the useable floor area of the cage;

b. generally vertical wall portions depending from said floor portions, said vertical wall portions being spaced from the respective cage walls, said wall portions each defining a shoulder engageable by a cage floor; and c. a ledge portion extending toward the interior of the cage from each of said wall portions and spaced below said floor portion, said ledge portions being adapted to support a respective edge portion of the cage floor thereon, said ledge portions being inclined downwardly from said vertical wall portions and toward the interior of the cage to permit liquid animal waste to flow therefrom into said waste receptacle;

d. said ledge portions terminating in depending flanges over an open top waste receptacle for flow of liquid animal waste from the floor portions, floor and ledge portions into said receptacle.

2. A urine deflector as set forth in claim 1 wherein the spacing between said floor portion and said ledge portion is substantially equal to the thickness of the cage floor supported on said ledge portion whereby an upper surface of the cage floor and an upper surface of said floor portion are substantially flush and cooperate to define the useable floor area.

3. A cage for laboratory animals and comprising:
 a. a frame having a base and a top and a plurality of upstanding support members extending therebetween, said frame having a closed top;
 b. side and rear cage walls and a front door extending between and secured to said support members to define an enclosure for at least one animal, said cage having an open front with said front door being mounted for swinging movement to selectively open the interior for access thereto and to close same to retain the animal therein, at least one of said cage walls and door having spaced openings over a major portion of the area thereof;
 c. an open-top waste collecting receptacle supported on the base and removable through the cage front;
 d. means on said cage side and rear walls defining a urine deflector extending therefrom and toward the interior, said urine deflector being spaced above the waste collecting receptacle in the base of said frame;
 e. a cage floor having respective edge portions thereof spaced from said rear and side walls and supported on said urine deflector to define a lower limit of the enclosure, said cage floor having spaced openings over substantially the entire area thereof to permit animal waste to pass therethrough, said urine deflector having an inward and downward inclination sufficnent for flow of liquid waste with a portion between the respective cage wall and said cage floor to co-operate therewith in forming the useable floor area of the cage;
 f. said urine deflector including:
  1. said portions between the respective cage wall and the cage floor being inclined downwardly from the respective cage wall and toward the interior sufficiently to permit liquid animal waste to flow toward said cage floor;
  2. a generally vertical wall portion depending from said floor portions of said urine deflector and spaced from said respective cage wall, said wall portion defining a shoulder engageable by said cage floor; and
  3. a ledge portion extending toward the interior from said wall portion and spaced below said floor portions and adapted to support said respective edge tion of said cage floor thereon, said ledge portion being inclined downwardly from the respective vertical wall portion and toward the interior sufficiently to permit liquid animal waste to flow therefrom and into said receptacle.

4. A cage for laboratory animals as set forth in claim 3 includling a flange depending from said ledge portion of each of said urine deflectors and spaced from said respective wall portion, said flange of each of said urine deflector having a lower edge positioned above said open top receptacle.

\* \* \* \* \*